April 25, 1933. V. B. SEASE 1,905,188
POSITIVE PHOTOGRAPHIC FILM
Filed Aug. 2, 1930
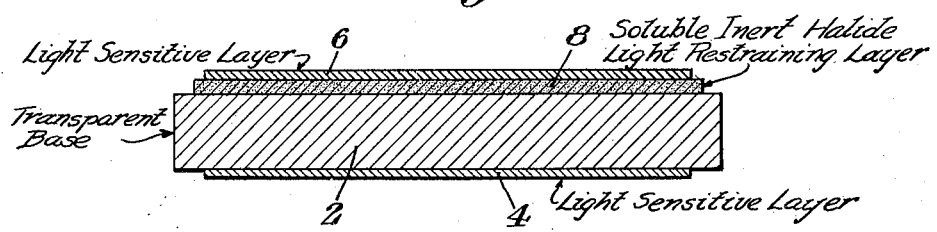
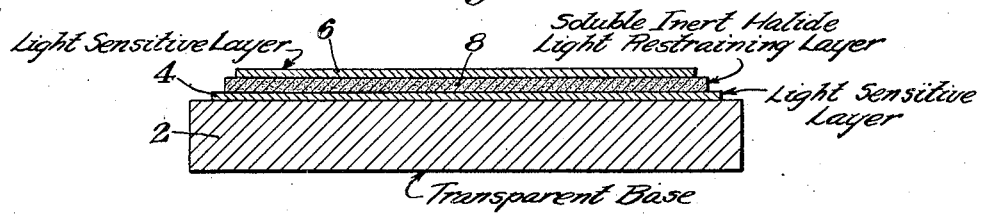
INVENTOR
Virgil B. Sease
BY
Prindle, Bean & Mann.
his ATTORNEYS.

Patented Apr. 25, 1933

1,905,188

UNITED STATES PATENT OFFICE

VIRGIL B. SEASE, OF PARLIN, NEW JERSEY, ASSIGNOR TO DU PONT FILM MANUFACTURING CORPORATION, OF NEW YORK, N. Y., A CORPORATION OF DELAWARE

POSITIVE PHOTOGRAPHIC FILM

Application filed August 2, 1930. Serial No. 472,682.

This invention relates to photography and particularly to color photography in which partial or complementary positive images are formed in a plurality of layers of sensitive emulsions and are later colored to produce the colored positive image when thrown on the screen. The negatives are taken in any of the well known ways, usually through complementary color filters or screens and then are developed and fixed to give black and white negatives which are used to make positives.

The use of light restraining layers between the sensitive emulsions on the multicoated positive films to prevent the printing light which is used to print one sensitive emulsion from passing through that emulsion and printing another emulsion behind it, has been suggested but has not met with favor. The light restraining layers have heretofore usually contained a light restraining dye and the use of free silver in the light restraining layer has even been suggested. The difficulty with light restraining dyes, however, is that they quite frequently bleed into the emulsion layer and alter the photographic quality of the film when it is being coated; also when it is being treated subsequent to exposure the dye quite frequently bleeds with the result that the film is stained or discolored and very often the dyes are rather hard to remove. Furthermore, the use of free silver in the light restraining layer is not satisfactory because of the number of extra steps which have to be used in making the film and also because the free silver is not removed from the light restraining layer in the usual treatment by which the film is developed and fixed.

The film which I have invented overcomes these disadvantages in that it contains no dye or other material which at any time during the making of the film or its subsequent use will bleed into or stain or discolor the sensitive emulsion or change its photographic qualities with the resulting advantage both to the manufacturer and user, that the manufacturer is sure of maintaining the uniformity and quality of his product and the user is enabled to handle the multicoated film with substantially the same apparatus and developers as he uses to handle and treat the ordinary black and white positive film. Another great advantage is that the film itself is clean and unstained and the one who treats and colors the positive film subsequent to its exposure and development will be assured that the color which is applied to the positive film will be the color which will be projected on the screen and that there will be no muddy or unclear parts on the picture projected from the projecting apparatus and that there will be no discolorations in the projected picture. Another object of the invention is such a film having a light restrainer which will disappear during the ordinary course of developing and fixing an exposed positive. This saves the cost of extra treatments to remove the dye from the light restraining layer to clear it, and reduces the possibility of the film or image being injured during the heretofore necessary step of removing or clearing the light restraining layer, or by the chemicals which are used in removing or clearing this layer. A further object of the invention is a film which can be made more easily and quickly than the usual film having a light restraining layer, and which can be made under substantially the same conditions and by the same methods and with substantially the same chemicals as are used in manufacturing a similar sensitive film which does not have the light restraining layer. A still further object of the invention is a process of producing and using such a film with the attendant advantages of low costs of production and treatment and the elimination of some of the steps which have heretofore been necessary in making a film with a light restraining layer and in getting rid of the light restraining layer after the film has been exposed.

Other objects and features of the invention will more fully appear from the following claims taken in conjunction with the description and accompanying drawing which must, however, be considered as merely illustrating and in no way limiting the invention to the specific embodiments shown and described.

In the drawing, Figure 1 is a section of such a film having two sensitized emulsion layers adapted to receive light impressions, the emulsion layers being placed on opposite sides of the base, and the light restraining layer underlying one of the sensitive emulsion layers; Figure 2 is a section of a similar film having two sensitized emulsion layers adapted to receive light impressions and an intermediate light restraining layer, all of the coatings being on the same side of the film base.

As is illustrated in Figure 1 of the drawing, the film includes a transparent base 2, which serves as a support for the sensitive emulsion layers 4 and 6 and the light restraining layer 8. The sensitive emulsion layers 4 and 6 contain any of the usual salts which are affected by exposure to light, preferably the silver halides, of which silver bromide is most universally used. Silver bromide or other sensitizer has grains of the size usually found in positive emulsions.

Between the sensitive emulsion layers, lies the light restraining layer which is preferably a silver halide suspension. I may use in the light restraining layer the same halide which is used in the sensitive emulsions 4 and 6 but in some respects silver chloride is preferable in the light restraining layer irrespective of which halide is used in the light sensitive emulsions. This is because the chloride gives finer grained and less sensitive emulsions. In a film having silver bromide in both the light restraining and sensitizing areas, the grains of silver halide in the light restraining layer are about one-half the average size of the grains in the light sensitive emulsion and there is about 50% by weight more silver halide of small grains in the light restraining layer than there is in the light sensitive emulsion, per unit of area. Where a light restraining layer containing silver chloride is used, the light restrainer may be appreciably less because the grains of silver chloride are ordinarily finer when made under the same conditions as silver bromide. The light restraining layer 8, therefore, is very much less sensitive to light than are either of the emulsions 4 and 6. This is accomplished by preparing the light restraining layer in any of the usual ways which render it less sensitive to light and also very fine grained. By the use of an extremely fine grained halide the light restraining layer will prevent the passage of light because of the greater subdivision of its particles and the greater total light obstructing area of the aggregate of the particles. At the same time, the light restraining layer is itself less sensitive than the usual light sensitive emulsions. Furthermore the exceedingly small grains of the light restraining halide are more easily attacked and removed from the light restraining layer during the fixing step, which is later carried out in the usual course of developing the film. It is also possible to use other halides and other materials which prevent the passage of light from one light sensitive layer into the other, but which can be removed during either of the two steps of developing or fixing the exposed film. Silver iodide may be used but there is difficulty in fixing it out in the treatment of the film after exposure. Whatever light restrainer is used, it is preferably fine grained to give a high opacity and, being relatively insensitive to light, it is unaffected to any appreciable extent by the printing exposures, and, therefore, fixes a definite boundary for the image penetration. The light restraining layer being composed of a silver halide, fixes out in the usual hypo treatment and leaves all of the emulsion layers clear and free from any tinges of color which may, and usually do, remain when dyes are used to control light penetration.

From the manufacturing point of view, such a film has many advantages. When making a film having the usual dye light-restraining layer, it is necessary to make up special batches of dye and to use every precaution that the dye-containing solution is handled and treated in exactly the right manner to prevent the dye from bleeding into the light sensitive emulsion or into the film base. Furthermore a special section of the film making machinery must be devoted to coating the dye layer on the base, and this special machinery is of practically no use for any other purpose because is contains the dye in all of its various parts. When making the film with the silver halide light restraining layer, however, the apparatus which applies the light restraining layer to the film base may be any of the usual machinery and it is not contaminated by having been used for applying the halide suspension to the film base. Moreover, the light restraining layer may be and preferably is a suspension which is made and applied in exactly the same way that the light sensitive emulsions are applied, that is, the viscosity is the same, the rate of speed of applying the suspension is the same and the drying and other working conditions are the same for both the light restraining suspension and the light sensitive emulsion and it is merely a question of applying another coating to the film base or to the previously applied light sensitive emulsion.

The advantages of making a film containing my light restraining layer, over making a film having a light restraining layer containing free silver, are also numerous. In preparing a film having a free silver light restraining layer, it is necessary to apply the light restraining layer, then expose it and then develop it, and then fix it to get the free silver. Between each one of these steps it is necessary to wash the film. I eliminate all of these steps and in the end I produce a light restraining layer from which the light restrainer is removed in the usual fixing baths, whereas it is necessary to bleach the free silver before it can be removed after the film has been exposed.

The film shown in Fig. 2 is similar to the film shown in Fig. 1, except that all of the layers are on the same side of the film base or support. The same advantages which were pointed out with regard to the film shown in Fig. 1 are obtained in the film shown in Fig. 2.

The film shown in the drawing may conveniently be manufactured in small factories by making the film base in the usual manner with the sub-stratum coating on both sides. After the base is prepared, it is brought to the coating machine and the first light-sensitive layer is coated in the usual manner. During the time that the partially finished film is being dried, the same coating machine is loaded with the molten light restraining suspension and, as the partially finished film is led through the coating machine, the light restraining layer is applied either to the bare side of the base or to the previously applied light-sensitive emulsion. After the light restraining layer has been applied, it is unnecessary to thoroughly clean the coating machine, but only to empty it of any of the light restraining suspension which may remain in the machine. Another batch of the light-sensitive emulsion is then placed in the coating machine and the light restraining layer is coated with the light-sensitive emulsion. One of the advantages of the film which I have invented is the simplicity of its manufacture and the elimination of all steps in the manufacture of the film except merely the coating steps.

The film which has heretofore been described may be used in the following manner. A print is made from one color separation negative on the positive layer 6, and another print is made from the other color separation negative on layer 4, both prints being registered as they were taken in the camera. In the case of the film in Figure 1, contact prints might be made in the ordinary way on both sides. In the case of the film illustrated in Figure 2, one contact print is made on layer 6 and a projection print is made on layer 4. The positive film with the images exposed in each layer is then developed and fixed as usual, and as a result of this simple treatment it is possible to obtain a positive film having the two emulsion layers containing the images, which may be treated in any of the well known and usual ways for bringing out the desired color, and there is no necessity for a separate bleaching step to get rid of free silver or other light restraining agents in the light restraining layer. Also there are no dyes to be removed from the light restraining layer. Such dyes have heretofore usually been removed by hydrosulphite or other chemicals which are not normally used in the developing and fixing of the silver image, and the hydrosulphite or other chemical which is used to remove the dye layer quite frequently injures the emulsion layers particularly by putting them into a very poor condition to accept dyes or be treated by the toning chemicals in the subsequent step of coloring the images. The advantage of the film which I have invented from the standpoint of the user, therefore, is that the film is treated in the simple manner in which the usual black and white film is treated, thereby rendering unnecessary the previously required steps of removing the light restrainer, and preventing the film from injury by the chemicals and manipulations which have heretofore been required in getting rid of the light restrainer.

Although a particular and preferred form of the invention has been described, it is recognized that various modifications may be made, and it is desired that the invention be construed as broadly as the claims, taken in conjunction with the prior art may allow.

What I claim is:

1. A positive photographic film having a base, a plurality of light sensitive emulsions, and a relatively light insensitive light restraining layer in a position to prevent the light from passing from one sensitive emulsion into another, said light restraining layer containing a suspension of a photographically inert salt which will be subsequently removed when said film is submitted to the usual developing, fixing, and finishing processes.

2. A positive photographic film having a base, a plurality of light sensitive emulsions, and a relatively light insensitive light restraining layer in a position to prevent the light from passing from one sensitive emulsion into another, said light restraining layer containing a relatively large amount of silver halide to prevent the passage of light through the light restraining layer.

3. A positive photographic film having a base, a plurality of light-sensitive emulsions, and a light insensitive light restraining layer in a position to prevent the light from passing from one sensitive emulsion into another, said light restraining layer containing a suspension of fine grain silver halide in sufficient amount to prevent the passage of the light.

4. A positive photographic film having a base, a plurality of light-sensitive emulsions at least one of which contains as a sensitizer a silver halide in such form as to render it readily sensitive to light, and a light restraining layer in a position to prevent the light from passing from one sensitive emulsion into another, said light restraining layer containing a light restrainer which is a substantially non-sensitive form of the sensitizer in one of the light-sensitive emulsions.

5. A positive photographic film having a base, a plurality of light-sensitive emulsions at least one of which contains as a sensitizer a silver halide in such form as to render it readily sensitive to light, and a light restraining layer in a position to prevent the light from passing from one sensitive emulsion into another, said light restraining layer containing a light restrainer which is a substantially non-sensitive form of a silver halide.

6. A positive photographic film having a base, a plurality of light-sensitive emulsions at least one of which contains as a sensitizer a silver halide in such form as to render it readily sensitive to light, and a light restraining layer in a position to prevent the light from passing from one sensitive emulsion into another, said light restraining layer containing a light restrainer which is a substantially non-sensitive form of the silver halide which is used to sensitize one of the light-sensitive emulsions.

7. A positive photographic film having a base, a plurality of light-sensitive emulsions at least one of which contains as a sensitizer a silver halide with sufficiently large grains to render it readily sensitive to light, and a light restraining layer in a position to prevent the light from passing from one sensitive emulsion into another, said light restraining layer containing a light insensitive light restrainer which is a silver halide with smaller grains.

8. A positive photographic film having a base, a plurality of light-sensitive emulsions at least one of which contains as a sensitizer a silver halide with sufficiently large grains to render it readily sensitive to light, and a light restraining layer in a position to prevent the light from passing from one sensitive emulsion into another, said light restraining layer containing a light restrainer which is a silver halide with smaller grains more densely associated to produce a high opacity light restraining layer substantially non-sensitive to light.

9. A method of preparing photographs on positive films having a transparent base and a plurality of positive light-sensitive emulsions which includes coating the base with a plurality of the light-sensitive emulsions, placing a light restraining layer between two of the light-sensitive emulsions, the light restraining layer containing as a light restrainer a relatively light insensitive high opacity silver halide suspension, exposing the light-sensitive emulsions to light whereby the light restraining layer prevents the passage of light through one emulsion into the other, treating the exposed film to bring out the images formed in the respective light-sensitive emulsions and fixing the film to clear it, and simultaneously to remove the light restrainer from the light restraining layer.

10. A method of preparing photographs on positive films having a transparent base and a plurality of positive light-sensitive emulsions which includes coating the base with a plurality of the light-sensitive emulsions, placing a light restraining layer between two of the light-sensitive emulsions, the light restraining layer containing as a light restrainer a relatively light insensitive high opacity silver halide suspension, exposing the light-sensitive emulsions to light whereby the light restraining layer prevents the passage of light through one emulsion into the other, treating the exposed film to bring out the images formed in the respective light-sensitive emulsions and fixing the film to clear it, and simultaneously to render the light restraining layer transparent.

11. A method of preparing color photographs on positive films having a transparent base and a plurality of positive light-sensitive emulsions which includes coating the base with a plurality of the light-sensitive emulsions, placing a light restraining layer between two of the light-sensitive emulsions, the light restraining layer containing as a light restrainer a relatively light insensitive high opacity silver halide suspension, exposing the light-sensitive emulsions to light whereby the light restraining layer prevents the passage of light through one emulsion into the other, treating the exposed film to bring out the images formed in the respective light-sensitive emulsions fixing the film to clear it and to simultaneously render the light restraining layer transparent, and thereafter coloring the images to produce a color film.

In testimony that I claim the foregoing, I have hereunto set my hand this 29th day of July, 1930.

VIRGIL B. SEASE.